Patented Mar. 16, 1937

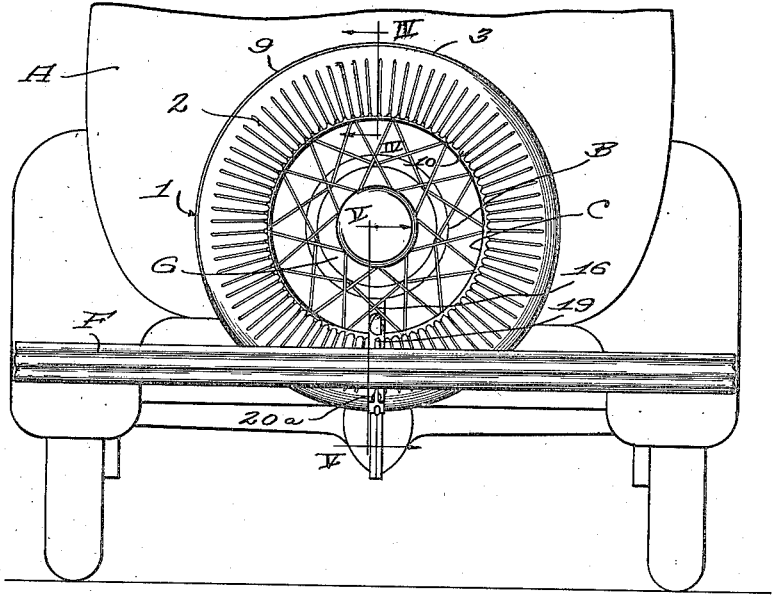
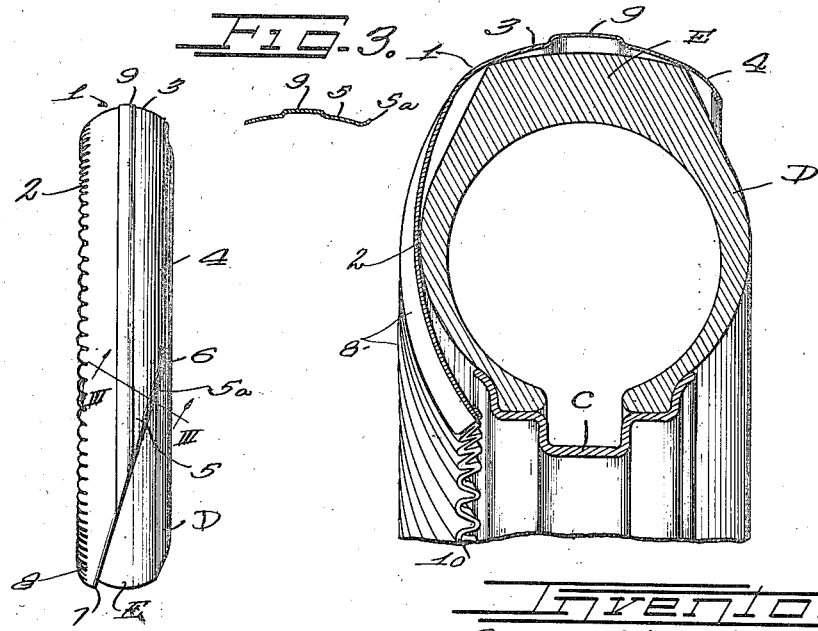

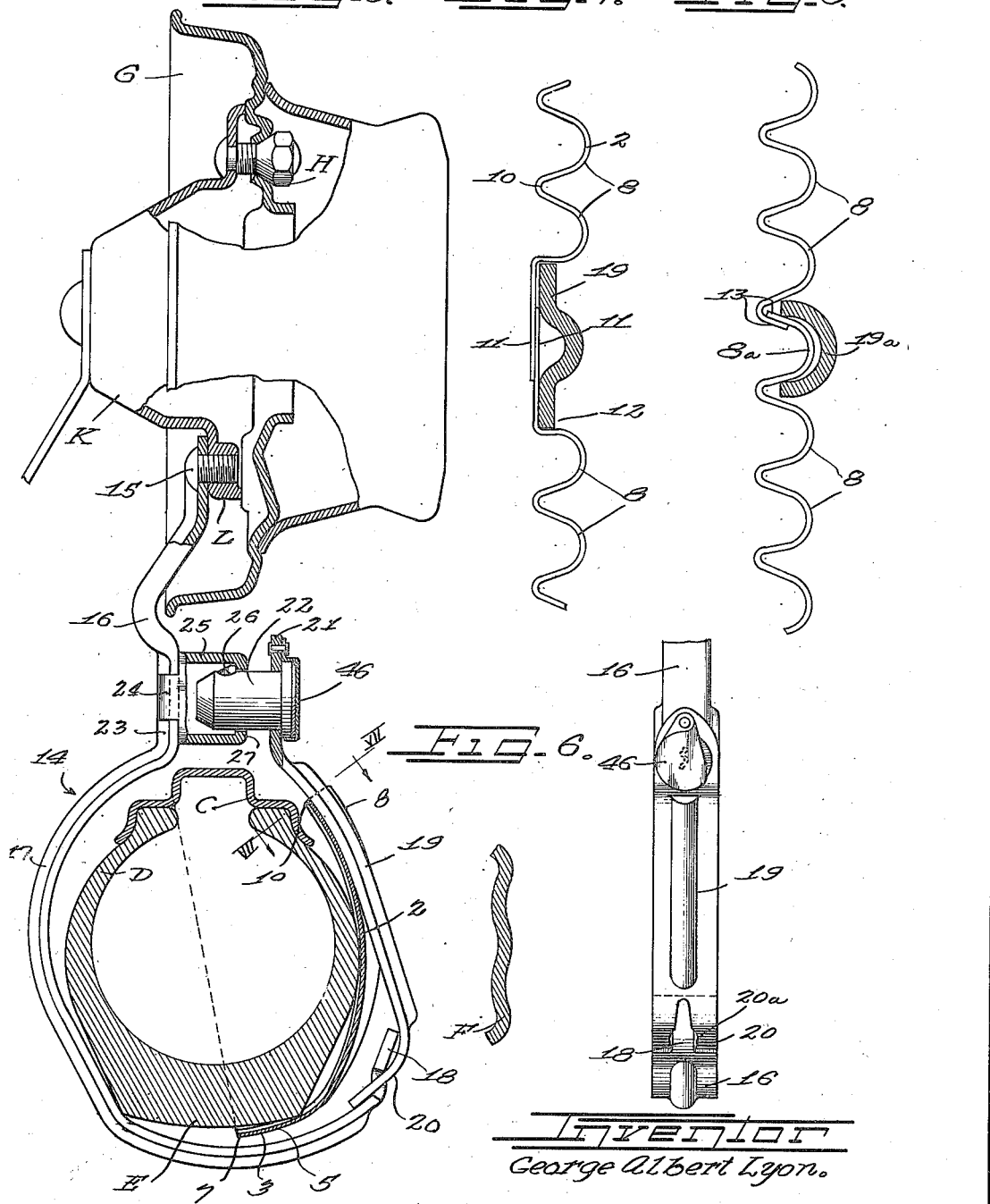

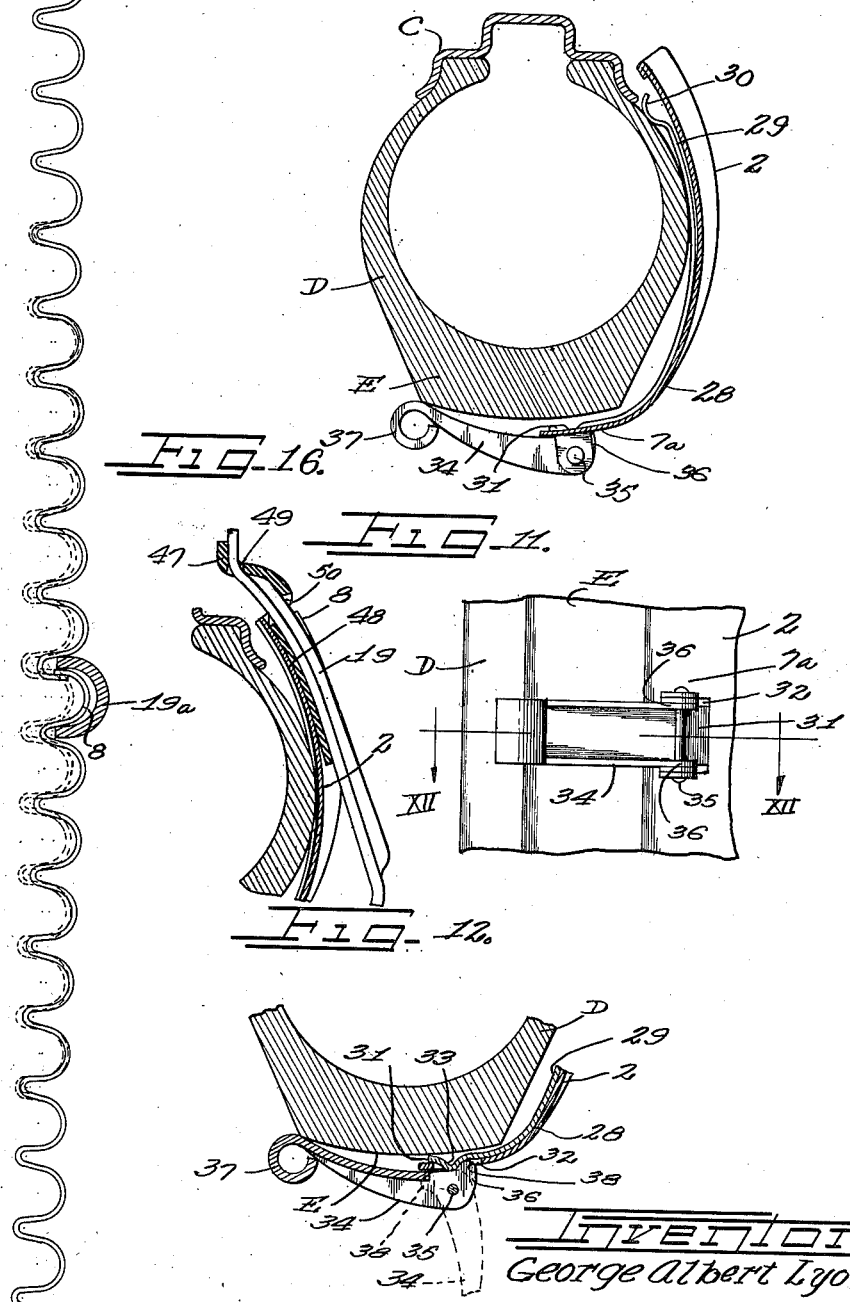

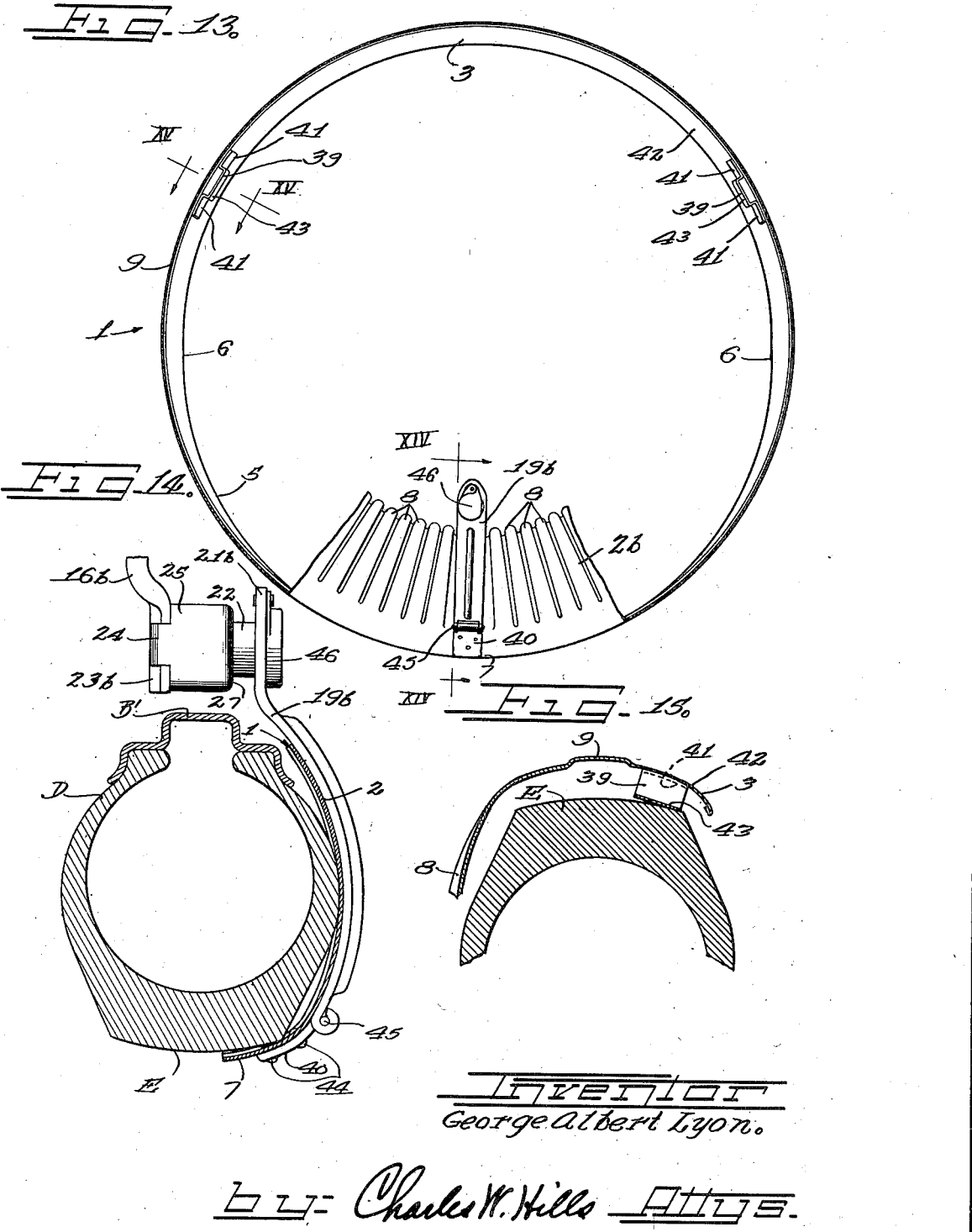

2,073,845

UNITED STATES PATENT OFFICE 2,073,845

TIRE COVER CONSTRUCTION

George Albert Lyon, Detroit, Mich., assignor to Lyon Incorporated, Asbury Park, N. J., a corporation of Delaware Application October 3, 1932, Serial No. 635,933
Renewed March 28, 1936

11 Claims. (Cl. 150—54)

This invention relates to tire covers and has to do more particularly with a tire cover which may be placed on a spare tire with substantially a single operation and will hold itself thereon.

It is an object of this invention to provide a one-piece resilient tire cover in the form of an unbroken or complete circle so constructed as to be capable of being applied to and removed from a tire with substantially a single operation in each case.

It is another object of the invention to provide a complete circular one-piece tire cover constructed so that it will flex about an axis at right angles to its own axis.

It is another object of the invention to provide a tire cover which will completely cover the outer side wall of a spare tire and which may be readily applied to and removed from a spare tire even when a bumper of the car is in close proximity thereto.

It is another object of the invention to provide means for securing this character of cover against theft from a spare tire.

It is a still further object of the invention to provide a cover of this character and means for securing the same against theft from the spare tire, the cover being of such construction that when cooperating with the theft proof means, said cover is pressed against the tire.

A further object of the invention resides in the provision of a shove-on complete circular tire cover formed to be disposed over a side wall and the major portion of the tread of the spare tire, the side wall covering portion of the cover being formed with corrugations to permit the cover to flex and thereby facilitate application and removal thereof with respect to the spare tire.

A still further object of the invention is to provide a tire cover in the form of a continuous ring, and means associated with the cover to prevent removal thereof from a tire and at the same time prevent circumferential relative movement between the cover and the tire.

It is also an object of this invention to provide a tire cover of this character with means for holding the same on the tire against rattling.

In accordance with the general features of the invention, a tire cover in the form of a continuous ring has a side wall which is provided with substantially radial corrugations throughout its circumference, and a tread covering rim having a portion which extends substantially entirely across the tread of the tire throughout a circumferential extent substantially in excess of 180°, the remainder of the rim being cut on a bias from the front margin thereof to the rear margin of said portion. The material of the cover is resilient sheet metal or any other substance having the desired properties. The rear edge of said portion extends inwardly of the outer periphery of the tread of the tire to hold the cover on the tire. To apply the tire, it is necessary merely to hook one end of said portion over the tread, grasp the opposite end and flex the same radially outward to allow the same to be shoved clear across the tread to occupy the same relation thereto as the first end, and then, if necessary, force the cover by moving the same in its own plane toward the tire into proper tire protecting position. Obviously this requires practically a single operation, and by reversing the same the cover may be removed.

The cover has its side wall substantially radially corrugated through its circumference to lend flexibility thereto in the application and removal of the cover with respect to the spare tire. Suitable locking means may be provided to prevent theft of the cover from the tire, said locking means being preferably formed to cooperate with the side wall of the cover to prevent relative movement therebetween and to hold the cover against rattling. Instead of providing the theftproof means, a readily releasable hand operated instrumentality may be provided in conjunction with the cover to hold the same against rattling on the spare tire and at the same time aid in preventing accidental removal or loss of the cover from the tire.

This form of tire cover is such that it may be applied to and removed from a spare tire carried, for example, at the rear of an automobile, even where the rear bumper is in close proximity to the tire. The cover is, moreover, made in one piece and requires few manufacturing operations so that its cost of construction is low and the cover is easily handled. The corrugations in the side of the tire cover, in addition to providing for adequate flexibility, serve to greatly enhance the appearance of the cover and consequently of the car in connection with which the same is used.

Further objects and advantages of the invention will appear as the description proceeds.

This invention (in preferred forms) is illustrated in the drawings and hereinafter more fully described.

Figure 1 is a fragmentary elevation of the rear of an automobile showing one form of the invention applied to a spare tire.

Figure 2 is a side elevation of a tire cover constructed in accordance with the principles of the present invention applied to a spare tire, viewed from the right of Figure 1.

Figure 3 is a fragmentary sectional view taken as indicated by the line III—III in Figure 2.

Figure 4 is an enlarged fragmentary sectional view taken approximately in the plane designated by the line IV—IV in Figure 1.

Figure 5 is an enlarged fragmentary sectional view showing theft-proof retaining means in conjunction with the tire cover constructed in accordance with the principles of this invention, and taken in the plane designated approximately by the line V—V in Figure 1.

Figure 6 is a fragmentary side elevation of the retaining means shown in Figure 5.

Figure 7 is a view showing a fragmentary enlarged horizontal development of the connected ends of the tire cover, taken as indicated by the line VII—VII in Figure 5, the cooperating part of the theft-proof means being shown in section.

Figures 8 and 9 are views similar to Figure 7 but showing modified constructions.

Figure 10 is a fragmentary sectional view taken in substantially the same plane as Figure 5 but showing a somewhat modified cover retaining construction.

Figure 11 is a fragmentary bottom view of the form of the invention appearing in Figure 10.

Figure 12 is a fragmentary sectional view taken approximately in the plane indicated by the line XII—XII in Figure 11.

Figure 13 shows, partly in section and partly in elevation, a modified tire cover and retaining means therefor.

Figure 14 is a fragmentary enlarged sectional view taken as indicated by the line XIV—XIV in Figure 13, with a cooperating tire included.

Figure 15 is a fragmentary enlarged sectional view taken as indicated by the line XV—XV in Figure 13, a portion of a cooperating tire being included.

Figure 16 is a fragmentary sectional view showing a modification of the clamping structure of Figure 5.

Referring now more particularly to the drawings, wherein certain forms of the invention are shown for illustrative purposes only, Figure 1 shows the rear of an automobile A provided with a spare wheel carrier B on which a spare wheel C is mounted. A tire cover 1 constructed in accordance with the principles of this invention is mounted upon the spare tire D. The cover 1 comprises an annular member having a side portion or plate 2 which serves to cover the outer side wall of the spare tire D and a rim 3, a portion 4 of which is of substantially hook form in transverse section and extends substantially entirely across the tread E of the tire C throughout substantially more than one-half of the periphery of the tread, the remainder 5 of the rim portion 3 tapering from the ends 6 of the first mentioned portion 4 to a point 7 short of the substantially radial corrugations 8 of the side plate 2. The rim 3 is preferably provided substantially in its central plane parallel to its axis with a reinforcing and ornamental bead 9. The corrugations 8 extend throughout substantially the entire width of the side plate to the inner periphery 10 of said side plate 2.

In the application of the cover 1 to and removal from the spare tire D, various methods may be employed. Whatever method is used some flexure involving a distortion of the side portion 2 of the cover takes place. To the end that the distortion necessary to the proper manipulation of the cover may take place within the elastic limit of the material of which the cover is made, such as sheet metal, that is, in order that, after the distortion, the cover may assume its normal condition or shape when the flexing pressure is removed, the corrugations 8 are provided. The bias cut edges of the part 5 of the rim 3 are turned or flared outwardly at 5ª to facilitate manipulation of the cover.

As above stated, different methods of applying the cover to and removing the same from the spare tire may be employed. One way of applying the cover would involve the placing of one end 6 of the rim portion 4 over the tread substantially in the manner shown in Figure 2, while the opposite end 6 is disposed forwardly of the opposite tread portion of the tire D. The second end 6 is then grasped and pulled laterally away from the first end 6 sufficiently to clear the adjacent tread of the tire, whereupon said second end and the adjacent turned edge 5ª are shoved across said adjacent portion of the tread until the second end occupies the same relation to the tire that the first end 6 occupies, as seen in Figure 2. At this stage, the intermediate part of the rim portion 4 may be somewhat spaced from the adjacent portion of the tread. In such event, the intermediate part of the rim portion 4 is thumped or otherwise forced toward the tire D, until substantially the entire rim 3 is in embracing relation to the tire. It will be observed that in flexing the second end 6 of the rim portion 4, a distortion of the side 2 of the cover necessarily occurs, and as above pointed out, the corrugations 8 amply take care of this condition.

It will be noted that this tire cover construction adapts itself well to a rear mounting, where the bumper F may be positioned fairly close to the spare wheel, as shown in Figure 5. In removing the cover 1 from the tire, one of the ends 6 may be flexed outwardly as in applying the cover, and then forced forwardly across the tread, thereby again flexing the side plate 2. With the rim 3 tapered off toward the bottom thereof as indicated at 5, the extent to which the cover 1 must be moved toward the bumper F in its removal from the tire D is necessarily reduced, and, in the space provided between the cover 1 and the bumper, the cover may be applied to and removed from the tire D without any appreciable interference from the bumper.

While the cover 1 may be formed from an annular blank of sheet metal or other material having the desired properties, it is also feasible to construct the same from a strip of material, welding, riveting or otherwise suitably connecting the ends in any suitable manner, for example as shown in the two forms appearing in Figures 7 and 8. In Figure 7, the ends 11 of the strip of which the cover is made are flattened and connected by a lap joint in such a manner as to provide a recess or pocket 12 between the end corrugations 8. The purpose of this pocket will appear as the description proceeds. In the form of the invention appearing in Figure 8, the entire length of the strip is corrugated, including the ends 13 which are also connected in any suitable manner, as by a lap joint, in such a way as to maintain the continuity of the corrugations 8, the corrugation 8ª formed by the ends 13, 13, performing a function which will appear as the description proceeds.

The amount by which the rim portion 4 exceeds 180° in extent when applied to the tire D depends preferably upon the extent to which the material forming the cover 1 will yield. For example, if the person handling the same in connection with a spare tire may readily pull the end portions 6 away from the tread of the tire D with but a slight exertion, the part 4 may be formed to embrace a relatively greater circumferential portion of the tread of the tire. In the event the material is such that the ends may be flexed sufficiently to move across the tread of the tire only with difficulty, then preferably the portion 4 would not extend perhaps more than a slight amount beyond half the periphery of the tread. In any event, however, it is preferred that the part 4 have a circumferential extent when disposed about the tire substantially in excess of 180° in order that it will offer appreciable resistance to removal, accidental or otherwise, of the cover 1 from the tire D. The side part 2 is preferably so constructed that it substantially hides the entire tire D when viewed as in Figure 1.

It may be found advisable to provide in conjunction with the tire cover 1, some form of locking means whereby theft of the cover from the spare tire may be prevented. Any suitable locking construction may be made use of for this purpose, one such construction being shown for illustrative purposes only in Figures 1, 5, and 6. The hub G of the wheel on which the tire D is mounted is bolted or otherwise suitably secured at H to the carrier K, the latter having a depending lug L to which one end of a band lock 14 is preferably permanently secured in any suitable manner, as at 15. The lock comprises a relatively stationary strap 16 which is preferably curved at its lower portion 17 to conform generally to the adjacent side and tread portions of the tire D and terminates at its lower end in a T-shaped portion 18. The lock includes a movable strap 19, the lower end 20 of which is provided with a key-hole 20a and is releasably pivoted to the end 18 of the strap 16. The strap 19 also conforms generally to the adjacent side wall of the tire D, and terminates at its upper end in an offset portion 21, to which a lock cylinder 22 is fastened in any suitable way, as by welding. The juxtaposed portion 23 of the strap 16 is straddled by substantially L-shaped arms 24 and securely interlocked therewith, said arms being part of a barrel 25 extending between the portions 21 and 23. The lock cylinder 22 carries a preferably spring-pressed key releasable plunger 26 which snaps into the barrel 25 and engages the rim 27 thereof to thereby lock the cover 1 on the tire against theft. A suitable key may operate in the cylinder 22 to effect a release of the cylinder from the barrel 25, in order that the cover 1 may be removed from the tire D.

Should the cover be formed from a strip or the like of material and have its ends connected as shown at 11 in Figure 7, providing a pocket 12, the movable strap 19 may be formed as shown in cross section in Figure 7 to fit into the pocket 12, thereby preventing relative rotary movement of the cover 1 and at the same time concealing the joint.

In the event the ends of the cover are connected as shown in Figure 8 to provide a corrugation 8a similar to the other corrugations 8, then, if desired, the strap 19a could be substantially U-shaped in cross section as shown in Figure 8, wherein it serves to conceal the joint and at the same time prevent relative rotary movement of the cover.

The lock construction, as above described, may take any desired form, but it is desirable that such lock construction as is used be formed to engage the cover for example as shown in Figure 5 in such a manner as to inhibit rattling of the cover with respect to the tire and with respect to the locking instrumentalities.

It may be desired to so construct the cover that the locking device exerts an appreciable pressure thereon against the tire D, and to this end the corrugations 8a and those 8 thruout about six inches on each side thereof may be bulged in a direction away from the tire as viewed in Figure 9. The strap then preferably engages over said bulged corrugations 8a and, when in locked position, as shown in dotted lines in Figure 9, causes the adjacent corrugations on both sides thereof to press tightly against the adjacent side wall of the tire. It is preferred that the bulged corrugations project outwardly to such an extent that a force is required to snap the plunger 26 into the barrel 25, the strap thus exerting a very substantial amount of pressure on said bulged corrugations to thereby hold the cover in firm anti-rattling engagement with the adjacent portion of the side wall of the tire D.

In accordance with another form of the invention, anti-rattling means of another form is provided as shown in Figures 10, 11, and 12. To this end, the cover, adjacent its narrow rim portion 7a, which in use may be positioned at or near the lower portion of the tire, has secured thereto at 28 as by spot welding or the like a spring element 29 which is here illustrated in the form of a leaf extending substantially radially within the side 2 of the cover. The upper end 30 of the spring 29 is rounded for engagement with the adjacent portion of the side wall of the tire and its other end 31 as well as the end 29 may be flexed. The rim portion 7a is provided with an opening 32 adjacent the end 31 of the spring 29, said end of the spring being bulged at 33 and projecting away from the tire through the opening 32.

A lever 34 is pivotally mounted at 35 in a position to at least partially overlie the opening 32 and is provided with cam portions 36 for engagement with the projection 33 of the spring 28. The lever 34 is of such extent that its curled free end 37 engages the rear side of the tread of the tire as shown in Figures 10, 11, and 12 when in operative position, said end 37 being formed as a hand grip whereby the same may be easily manipulated. When the lever 34 is in said operative position, the nose 38 of each cam portion 36 is positioned on one side and preferably in contact with the projecting portion 33 of the spring 28, said spring serving to resist movement of the lever 34 out of said position. When it is desired, however, to move the lever to inoperative position as shown in dotted lines in Figure 12, the same is grasped at 37 and swung around to the dotted position, the nose 38 riding up the projection 33 and forcing the same toward the tire D and then allowing said projection 33 to snap back toward the pivot 35, the parts being then arranged as shown in Figure 11 with the lever 34 in the dotted position.

The upper end of the spring 39 serves to prevent rattling between the cover and the tire, and the anti-rattling effect is augmented when the lever 34 is in the position shown in full lines in Figures 10, 11, and 12.

A somewhat modified tire cover construction is shown in Figures 13, 14, and 15. This cover in accordance with this form of the invention is essentially the same as that shown in Figure 1 but is provided additionally with anti-rattling spring elements 39 and with a hinge wing 40 for locking purposes.

Each spring element 39 may be generally U-shaped as shown and has flanges 4 by which the same is welded, riveted or otherwise suitably secured within the rear portion 42 of the rim 3. The web 43 of each element 39 is thus capable of being flexed and is arranged to engage the tire tread E at the rear margin thereof as shown in Figure 15 to serve as a retaining means. The elements 39 are moreover spaced apart substantially 120° and substantially equidistant from the narrow portion 7, and serve to hold the adjacent part of the cover in proper tire protecting position, even though the size of the tire may vary.

The hinge wing 40 is riveted at 44 or may be welded to the narrow rim portion 7 preferably so as to conceal the joint between the ends of the cover I. A strap 19$^b$ similar to the band lock strap 19 of Figure 5 is preferably permanently hinged at 45 to the wing 40 and is shaped to conform to the cover as shown in Figure 14. The locking instrumentalities include a stationary strap or hangar 16$^b$ which is supported by the carrier K in the same way as the strap 16 but terminates in its lock barrel supporting part 23$^b$ adjacent the wheel rim B' as shown in Figure 14. The strap 19$^b$ has an angularly extending part 21$^b$, and the parts 23$^b$ and 21$^b$ carrying the locking instrumentalities shown in detail in Figure 5 and described fully above. In both Figures 5 and 14, the key opening in the lock cylinder 22 has a pivotally supported cover 46.

The parts are so arranged that the strap 19$^b$ must be forced against the adjacent portion 2 of the cover and move the same slightly before the cylinder 22 will be interlocked with the barrel 25. This will insure a snug engagement of the cover with the tire and will inhibit rattling therebetween, and at the same time the cover will be properly locked on the tire. It will be observed that the locking means of Figure 5 and also that of Figure 8 serve not only to lock the cover in position on the tire but also to lock the tire and wheel against theft.

In the form shown in Figure 5, the strap 19 is removed from the strap 16 by first being turned to the right as seen in that figure and then being turned about a substantially vertical axis until the edge of the head 18 is alined with the slot 20$^a$, whereupon the end 20 of the strap 19 is raised clear of the head 18. This requires very little space at the rear and the space between the cover I and the bumper F, while small, is nevertheless ample.

With the structure appearing in Figure 14, it is necessary merely to release the lock cylinder from the barrel 25, whereupon the cover I is removed as described hereinabove. The cover may be shifted circumferentially on the tire before being locked thereon, so that it may be readily positioned with its strap 19$^b$ in proper cooperative relation with the stationary strap 16$^b$.

It will be noted that when the strap 19, 19$^a$, 19$^b$ is in locked position, it exerts a generally downward as well as a rearward force on the lower part of the cover, thereby holding the upper part 4 firmly in proper covering relation to the tire.

In Figure 16 is shown a rubber or the like anti-rattling means 47 a portion 48 of which is disposed between the cover side 2 and the strap 19. The means 47 is here shown for illustrative purposes as comprising a strip having slots 49 and 50 thru which the strap 19 is threaded so that the means 47 may be retained in position.

From the foregoing, it will be observed that in accordance with this invention, a tire cover construction of great simplicity consisting essentially of a single piece which may be easily handled and manipulated in its application to and removal from a spare tire is provided. The corrugations in the side of the cover serve not only to facilitate application and removal of the cover with respect to a spare tire, but function also to very appreciably improve the appearance of the cover and consequently of the car in connection with which the same is used. While the cover is shown applied to a rear mounting with a bumper in proximity thereto, the invention is well adaptable for use in connection with fenderwell mountings, the portion of the cover appearing at 7 and 7$^a$ being sufficiently narrow in a direction parallel to the axis of the cover to allow the same to fit between the outer wall of the fenderwell and the tire carried thereby, in view of the clearance usually provided in fenderwell constructions.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A tire cover construction comprising a substantially arcuate member for covering a part of a spare tire, said member including a generally radially extending resilient portion provided with substantially radial corrugations to augment the resilient characteristics of said portion whereby the same may be flexed to a substantial extent without permanent distortion in its application to and removal from a spare tire, and means for locking the member in proper tire covering position, said means having an interlocking relationship with said portion to prevent movement between said member and the tire.

2. Tire cover construction comprising a member of substantially arcuate form for covering a side wall of a spare tire, a portion of said member being offset from the remainder of said member laterally in a direction away from the tire when the member is in proper tire protecting position, a locking device including a pair of elements arranged when in locked relationship to be spaced apart by substantially the distance between the other side wall of the tire and that portion of the cover member which is not offset, whereby, when one of said elements is placed over the offset portion of the cover and the elements are interlocked, said offset portion is flexed toward the tire and the remainder of the member is held against rattling and in proper protecting relation to the tire.

3. A tire cover construction comprising a spare tire support, a spare tire cover having a rim part for disposition over only a portion of the tread portion of a tire carried by said support and a side part for disposition over the outer side wall of the tire, a member hinged opposite the rim part to the side part and swingable toward and away from said support, resilient means associated with said rim part for spacing the same from the tire tread and arranged for engagement with the tread on the side opposite said side part, and instrumentalities for locking the member to said support and arranged to exert a pressure, thru said member, on said side part toward the opposite wall of the tire and away from said rim part.

4. Tire cover construction comprising a rim part and a side part for disposition over tread and side wall portions of a spare tire, means including a strap for holding the cover on the tire, and a resilient element positioned between said strap and cover for preventing rattling therebetween.

5. Tire cover construction comprising a rim part and a side part for disposition over tread and side wall portions of a spare tire, means including a strap for holding the cover on the tire, and a resilient element positioned between said strap and cover for preventing rattling therebetween, and frictionally connected to said strap whereby said element may be adjusted along said strap.

6. A tire cover construction comprising a spare tire support, a spare tire cover having tread and side wall covering rim and side parts, means connected to the support and side part for locking the cover on the tire, and resilient spacing means opposite said first means and between the rim part and the tire tread, said spacing means being stressed to prevent rattling when the cover is locked on the tire.

7. A tire cover of substantially form-retaining sheet material having a side portion for covering a side wall of the tire and provided with substantially radial corrugations to render the same resiliently distortable, and a rim portion extending transversely from said side portion for disposition over and embracing the tread of the tire, a substantial circumferential part of said rim portion terminating rearwardly at the margin of the tread adjacent said side wall so as not to interfere with distortion of said side portion in the application and removal of the cover relative to the tire.

8. A tire cover comprising a member of substantially form-retaining sheet material, having a substantially circular side portion for disposition over a side wall of a tire and a rim portion extending from said side portion for circumscribing the tread of the tire, said rim portion extending substantially entirely across the tread of the tire throughout a circumferential extent substantially more than half of the periphery of the tread and being of reduced width throughout the remainder thereof, the widest portions of said remainder embracing the tire and extending inwardly and rearwardly of the maximum peripheral part of the tread to hold the cover on the tire, said side portion being substantially radially corrugated to render the same resiliently distortable substantially about a radial portion thereof to enable the rim portion to be flexed off and onto the tire.

9. A tire cover construction comprising a resiliently distortable substantially form-retaining side part for disposition over a side wall of a spare tire and a rim part for disposition over a portion of the tread of the tire and formed to be held resiliently by the side part in proper cooperative relation to the tread, means including the side part for engaging portions of the tire on opposite sides of the median plane of the tire, and means for clamping the first means against the tire to thereby hold the cover in proper tire protecting position.

10. A tire cover construction comprising a side part for disposition over a side wall of a spare tire and a rim part for disposition over only a portion of the tread of the tire, means including the side part for engaging portions of the tire on opposite sides of the median plane of the tire, means for clamping the first means against the tire to thereby hold the cover in proper tire protecting position, the second means affording a support for the tire and instrumentalities for releasably interlocking the support and the remainder of the second means, said second means being arranged to exert a force urging the first means toward the tire when thus interlocked.

11. A tire cover construction comprising a side part for disposition over a side wall of a spare tire and a rim part for disposition over only a portion of the tread of the tire, means, including a pair of circumferentially spaced elements and including the side part, engageable with circumferentially spaced portions of the tire on opposite sides of the median plane of the tire, to provide a three point support for the cover, and means for clamping the first means against the tire to thereby hold the cover in proper tire protecting position.

GEORGE ALBERT LYON.